United States Patent
Agrawal et al.

(10) Patent No.: US 10,577,109 B2
(45) Date of Patent: Mar. 3, 2020

(54) SYSTEM AND METHOD FOR DEPLANING AND BOARDING AIRPLANES

(71) Applicants: Sanskar Agrawal, Pennington, NJ (US); Sanskriti Agrawal, Pennington, NJ (US)

(72) Inventors: Sanskar Agrawal, Pennington, NJ (US); Sanskriti Agrawal, Pennington, NJ (US)

(*) Notice: Subject to any disclaimer, the term of this patent is extended or adjusted under 35 U.S.C. 154(b) by 443 days.

(21) Appl. No.: 15/460,300

(22) Filed: Mar. 16, 2017

(65) Prior Publication Data

US 2018/0265203 A1 Sep. 20, 2018

(51) Int. Cl.
*B64D 11/06* (2006.01)
*B64F 1/30* (2006.01)
*B64C 1/20* (2006.01)

(52) U.S. Cl.
CPC ............ *B64D 11/0639* (2014.12); *B64C 1/20* (2013.01); *B64D 11/0629* (2014.12); *B64D 11/0636* (2014.12); *B64D 11/0696* (2013.01); *B64F 1/30* (2013.01)

(58) Field of Classification Search
CPC ............ B64D 11/0639; B64D 11/0629; B64D 11/0636; B64D 11/0696; B64F 1/30
See application file for complete search history.

(56) References Cited

U.S. PATENT DOCUMENTS

| | | | | |
|---|---|---|---|---|
| 4,157,797 A * | 6/1979 | Fox | ................. | B64D 11/06 244/122 R |
| 2006/0163917 A1* | 7/2006 | Schroeder | .............. | B64D 11/06 297/188.1 |
| 2007/0015422 A1* | 1/2007 | Everhart | ................. | B64D 11/06 441/80 |
| 2009/0205530 A1* | 8/2009 | Mollet | .................... | A63G 27/00 104/20 |
| 2011/0276233 A1* | 11/2011 | Lofstrand | ................. | A61G 5/04 701/49 |
| 2012/0072079 A1* | 3/2012 | Schliwa | .................. | B64D 11/06 701/49 |
| 2014/0123462 A1* | 5/2014 | Rollfink | .................. | B64D 11/06 29/428 |

* cited by examiner

*Primary Examiner* — Rodney A Bonnette
(74) *Attorney, Agent, or Firm* — Standley Law Group LLP (57) ABSTRACT

A system and method for deplaning and boarding airplanes. The system is comprised of a track that provides a loop for transferring seats from the airplane, to a deboarding area, to a boarding area, and back to the airplane. Seats with integrated storage compartments lower onto the track via a connector for transporting the seat along the track and through the system.

29 Claims, 6 Drawing Sheets

SYSTEM AND METHOD FOR DEPLANING AND BOARDING AIRPLANES

BACKGROUND OF THE INVENTIVE FIELD

The present invention is directed to a system and method for deplaning and boarding airplanes. The airplane boarding process is highly inefficient today, taking 30 minutes to an hour depending on the size of the airplane. An equal amount of time is taken to deplane as well. The current deplaning and boarding process often results in long queues of people standing in line leading to frustrated and angry customers. The inefficient processes costs airlines and airports gate time and lost revenue. Adding another 15-30 minutes for cleaning of airplane, there is a significant opportunity to address these inefficiencies through a better boarding process that takes less time and resources.

The deplaning and boarding system and process of the present invention reduces deplaning/boarding time is more efficient for passengers and airlines alike. The present invention deploys a carousel-type baggage system to deplane and board passengers from/onto the airplane. In the preferred embodiment, storage compartments for luggage are incorporated into each seat which eliminates the requirement of passengers retrieving luggage from the overhead storage compartments. The present invention eliminates the hassle of boarding airplanes by zones and reduces overcrowding near the gate as well as inside the aircraft.

In the one embodiment, the system of the present invention will use a computer generated algorithm to board all the passengers. The seats will move from the front of the airplane to disembarkation and boarding areas on a track system and then to the back of plane in a carousel, loop, pattern. This system revolutionizes the boarding and disembarking process.

SUMMARY OF THE GENERAL INVENTIVE CONCEPT

In one embodiment of the invention, the invention relates to a system for deplaning and boarding an airplane, the airplane comprised of a first and second column of seats, the system comprising: a first track for moving seats in the first and second column of seats from the airplane to a deboarding area, to a boarding area, and back to the airplane; wherein the first column of seats is adapted to move to onto the first track and wherein the system is adapted to move the first column of seats along the first track; wherein the second column of seats is adapted to move onto the first track and wherein the system is adapted to move the second column of seats along the first track; wherein each of the seats is comprised of a compartment for storing luggage and a connector for connecting each seat to the first track.

In one embodiment, the seat is comprised of a camera for guiding the seat along the virtual track; and the seat is comprised a set of four wheels and motors connected each wheel for driving the seat along the virtual track; and the system is further comprised of a processing system, the processing system programmed with instructions executing on the processing system for controlling the movement of each of the seats to move along the virtual track. In one embodiment, the system is comprised of retractable glass doors adapted to move along the first track for providing separation between seats that are deplaning and seats that are boarding.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the example embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

Figure 1:
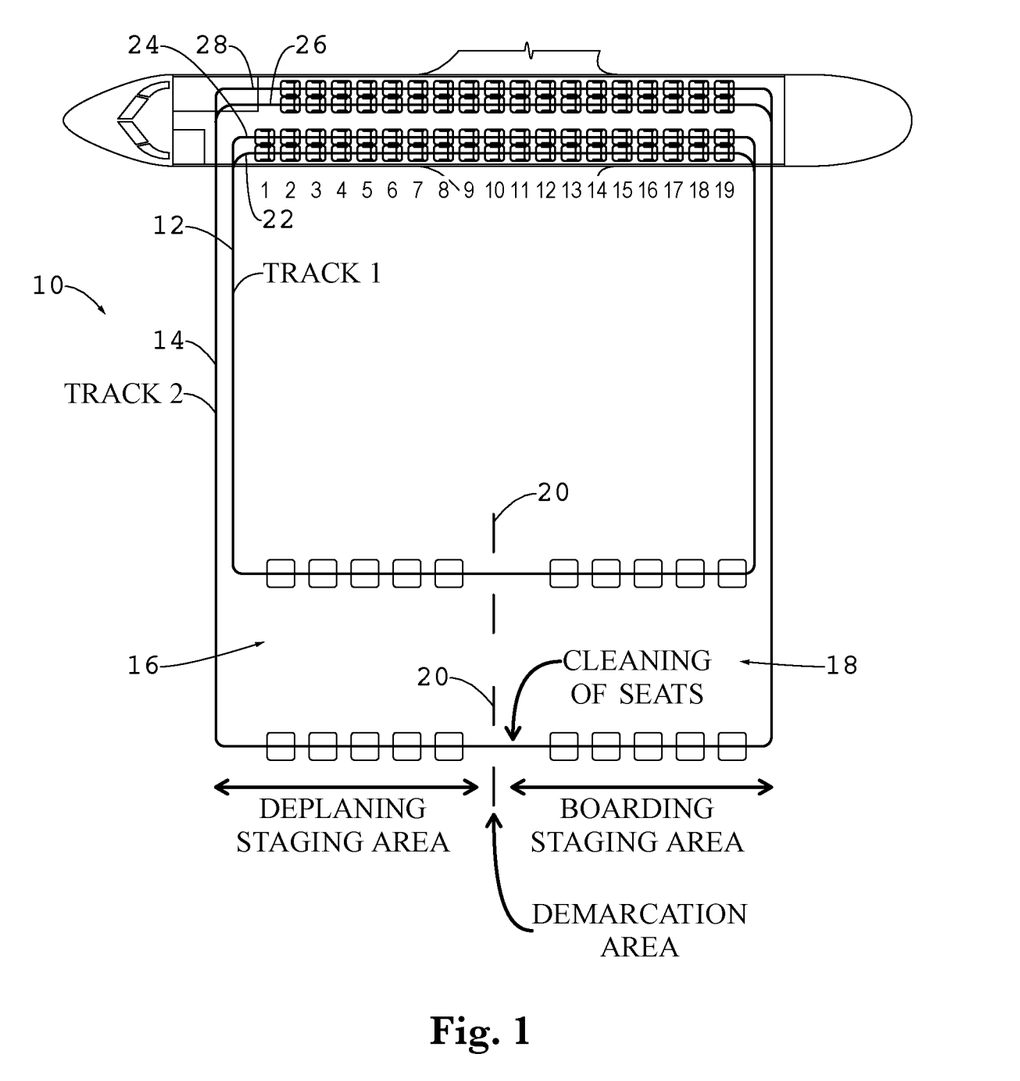
FIG. 1 illustrates a plan diagram of one embodiment of the deplaning/boarding system of the present invention.

FIG. 1 illustrates a plan diagram of one embodiment of the deplaning/boarding system 10 of the present invention. In the embodiment shown in FIG. 1, there are two tracks, Track 1 and Track 2, shown at 12, 14 respectively.

The deplaning/boarding system of the present invention is comprised of a track movement system that allows seats to move intelligently using a computer algorithm. The concept of track is important as part of this system (FIG. 1). A track can be physical track (e.g., conveyor) or a virtual track (such as a painted line). In the preferred embodiment, each track corresponds to a column, or columns, of seating in a plane (FIG. 1). For example, in the embodiment of FIG. 1, Track 1 deplanes/boards all the column A seats and column B seats. Track 2 deplanes/boards all the column C seats and column D seats. In this embodiment, each column of seats is on a separate seat-column track. For example, as illustrated, the two seat-column tracks (A and B, shown at 22 and 24 respectively) merge into into Track 1 and other two seat-column tracks (C and D, shown at 26 and 28 respectively) merge into Track 2.

Each column of plane seats is adapted to travel on tracks within the plane, to the air bridge and the lobby area, and then back to the rear of the plane (in this embodiment each seat eventually moving back to the original seat position it started from in the beginning of the deplaning process). For example, as shown in FIG. 1, the seats deplane on Tracks 1 and 2 where they enter the deplaning area 16. Here the passengers can get out of their seats and take the luggage out of the storage compartments in the seats as discussed in more detail below. This process is much faster than current processes because all of the passengers in the deplaning area can remove their luggage from storage at the same time, instead of having to wait for others to do so on the plane with traditional deplaning processes. Once all the passengers have deplaned from the seats in the deplaning area, the seats than move to the boarding/staging area 18 where passengers on the next flight can take their seats for boarding. In this embodiment, there is preferably a demarcation area 20 that separates the deplaning area from the boarding area.

Figure 2:
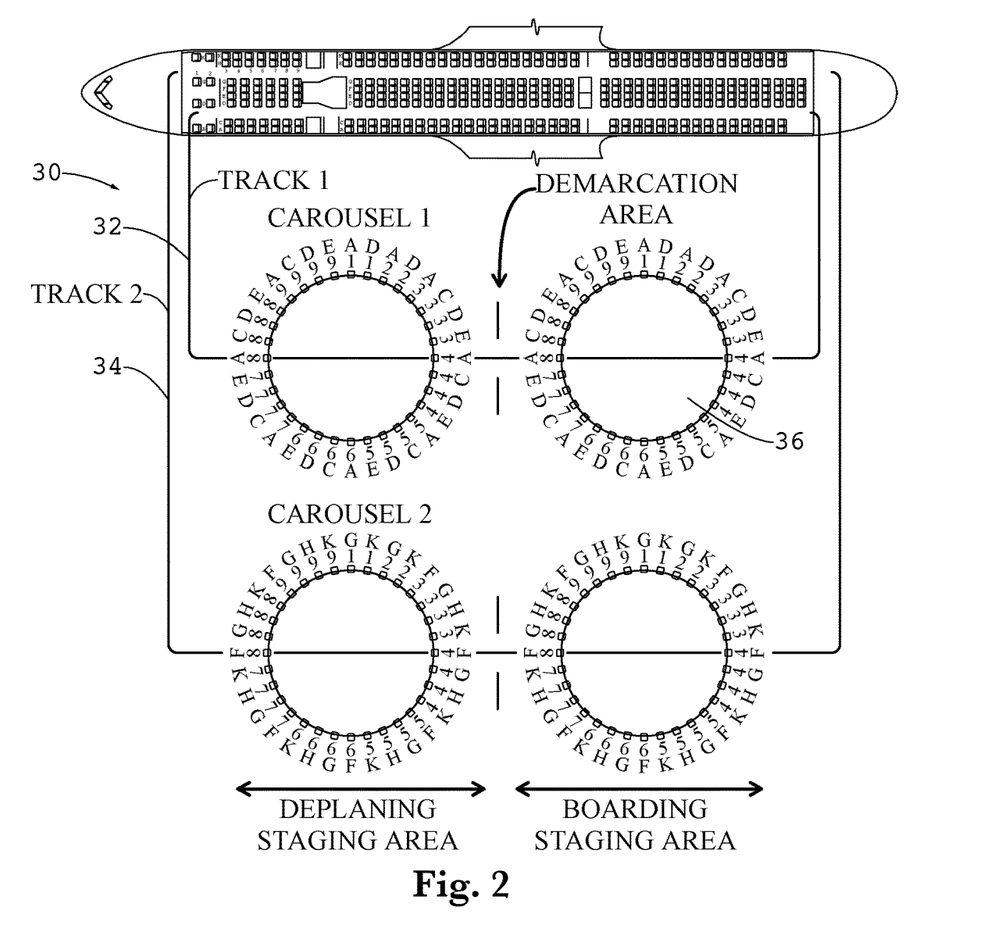
FIG. 2 illustrates a plan diagram of another embodiment of the deplaning/boarding system of the present invention.
Figure 3:
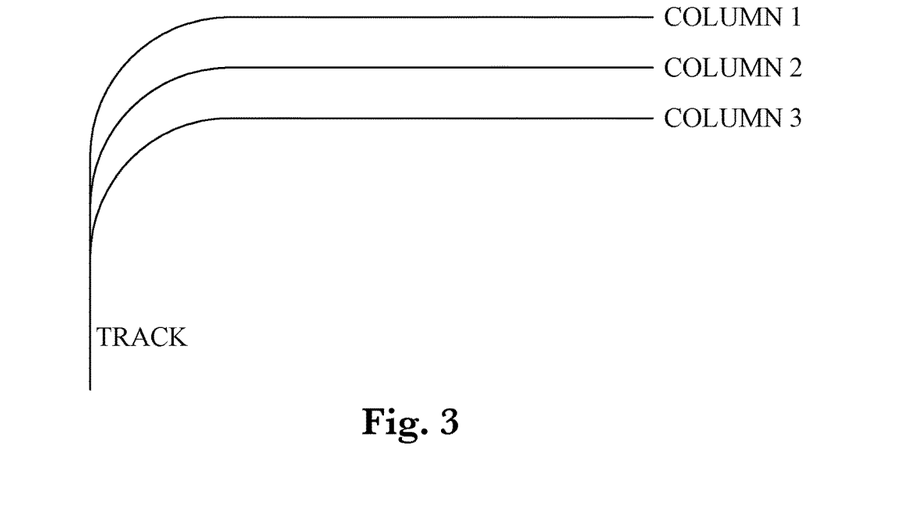
FIG. 3 illustrates three columns of seats (columns 1, 2 and 3) merging onto one track for deplaning.

FIG. 2 illustrates a plan diagram of another embodiment of the deplaning/boarding system 30 of the present invention. In FIG. 2, a larger plane is shown from FIG. 1. In the embodiment shown in FIG. 2, there are two tracks, Track 1 and Track 2 (shown at 32 and 34 respectively) for deplaning and boarding the seats. In an alternate embodiment, the system can be designed with more than two tracks due to the larger number of seat columns in the plane. For example, FIG. 3 illustrates three columns of seats (columns 1, 2 and 3) merging onto one track for deplaning. Similarly, the seats will merge back into three columns at the back of the plane when the seats are boarding for a new flight.

In the case of larger planes, to accommodate the large number of plane seats, the system can be adapted so that the seats/track are staged in a circular arrangement 36 instead of a linear arrangement so that more seats can be accommodated in the designated airport areas. In FIG. 2, almost 9 rows can be accommodated in each carousel area per track. In this embodiment, rows A, C, D and E merge into Track 1 while tracks F, G, H and K combine to form Track 2. Accordingly, as shown, the first 9 rows of the plane will deplane first with the next 9 rows following the first 9 rows as the first 9 rows move from the deplaning area to the boarding area. This process will continue until all the rows have been deplaned, boarded for the next flight and then returned to the plane (loop pattern). In this embodiment, the boarding and deplaning would require the air bridge to be bifurcated and the tracks would connect to both doors of the plane—front and back. The tracks would run in a circle along the air bridge: from front of airplane to deplaning area, from deplaning area to boarding area, from boarding area to back door of plane (along air bridge) and all along the length of the plane.

In one embodiment, all seats of a row will deplane together in a group (e.g., seats 1A, 1C, 1D, and 1E), however in another embodiment, all seats in a column can deplane together (e.g., 1A, 2A, 3A, 4A, etc . . . ). In yet another embodiment, a combination of these two deplaning methods may be employed.

Once these passengers deplane or disembark, the seats move on the tracks to the right carousel area which is in a gated boarding/staging area (see FIG. 2). Here the boarding process can begin. In the meantime, all rows in plane will move forward by 9 rows. The seats upfront (e.g. first class) may use alternate tracks to allow for more spacing between seats while business/economy seats may use their own set of tracks. In an alternative embodiment, first class seats may be aligned with one of the seat columns of the economy seats so they can travel on the same track.

Figure 4:
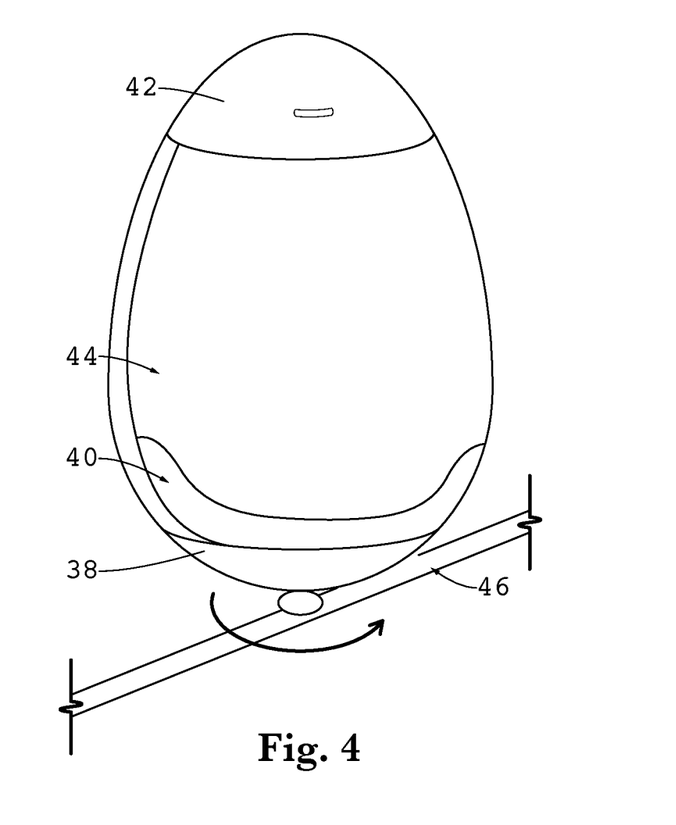
FIG. 4 illustrates one embodiment of the integrated seat unit of the present invention.

FIG. 4 illustrates one embodiment of an airline seat of the present invention. In this embodiment, the seat is formed into a single integrated unit comprising a base 38 which houses the emergency equipment, DVR etc., actual seat 40 and storage 42 all integrated into one unit. In this embodiment, the seat is also comprised of cut-out window/door openings 44 that allow the passenger to get into and out of the seat. This seat design obviates the need for separate storage compartments in plane, opening up the space above the seat for a more aesthetic plane environment. The storage portion of the seat is connected to the seat via a plastic or aluminum lightweight unibody seat portion or by supporting the storage on seat body. In one embodiment, the seat is adapted so that it can be raised up one or two notches.

The seats of present invention have mechanisms for riding on the tracks or guide rails 46 as previously discussed. These specialized seats are capable of moving from the plane to the airport boarding area and allows each passenger to place their luggage in their own overhead storage compartment. If the passenger has more than one piece of luggage or a piece of large luggage that cannot be carried on their person, it can be transferred to check-in baggage for storage.

Figure 5:
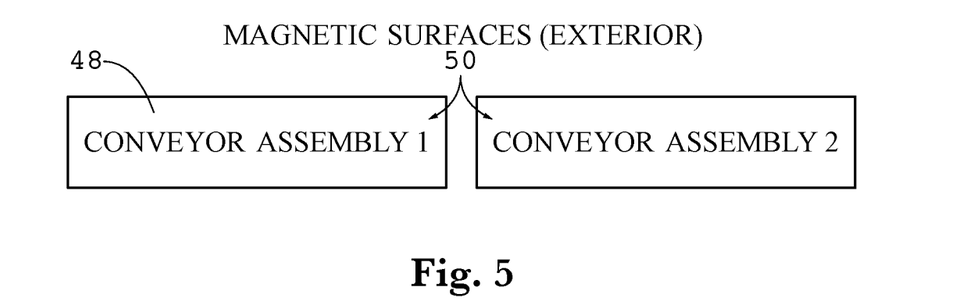
FIG. 5 illustrates one embodiment of a seat conveyor assembly.

In one embodiment of the invention, the tracks, along which seats move, will be a physical track. The physical track may be comprised guide rail or a conveyor belt 48 as shown in FIG. 5. The conveyor belt mechanism may be contained in a conveyor assembly having rollers for driving an exposed conveyor belt. In one embodiment, the conveyor mechanism is comprised of modular units adapted to be connected together via magnetic surfaces 50. As shown in FIG. 5, these modular conveyor units can be connected to form a single assembly. Each surface can be adapted such that a second module can simply snap-in aided by the magnetic surfaces. As discussed, multiple seat-column tracks combine to form a single track that is preferably built into the plane itself.

Figure 6A:
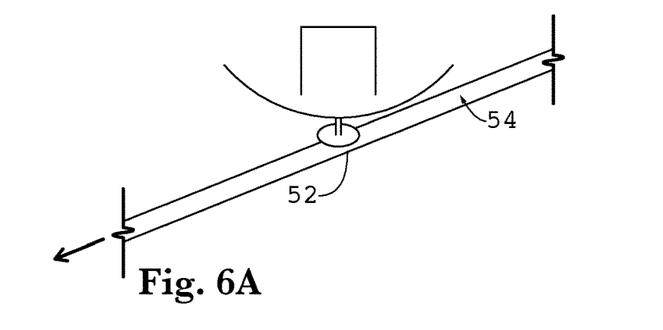
FIG. 6A illustrates one embodiment of the electromagnetic seat connector of the present invention connected to the magnetic surface of the conveyor system of the present invention.
Figure 6B:
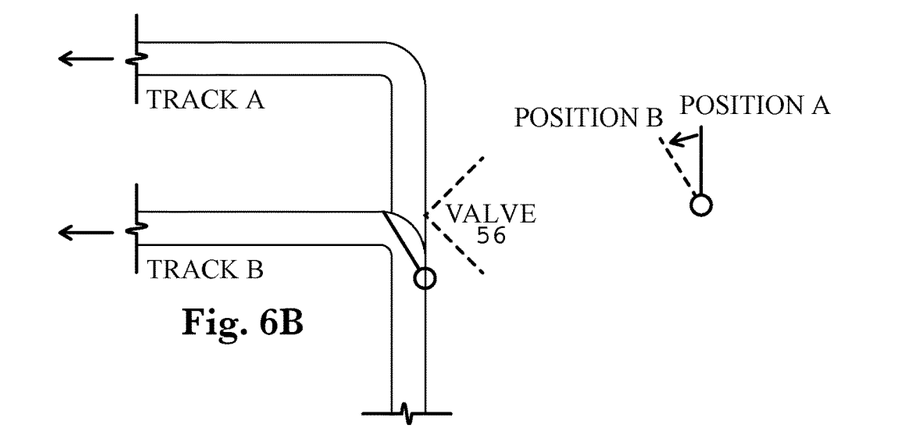
FIG. 6B illustrates one embodiment of the track of the present invention showing how a valve can control which track the seats will merge onto.

FIG. 6a illustrates one embodiment of the electromagnetic seat connector 52 of the present invention connected to the magnetic surface 54 of the conveyor system of the present invention. FIG. 6b illustrates one embodiment of the track of the present invention showing how a valve 56 can control which track the seats will merge onto.

Figure 7A:
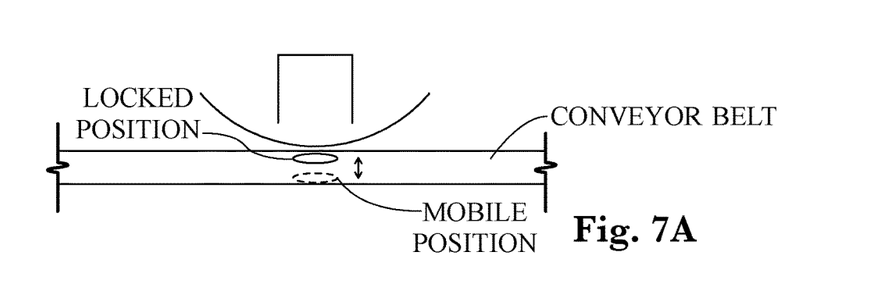
FIG. 7A illustrates one embodiment of a side view of each seat/conveyor assembly.
Figure 7B:
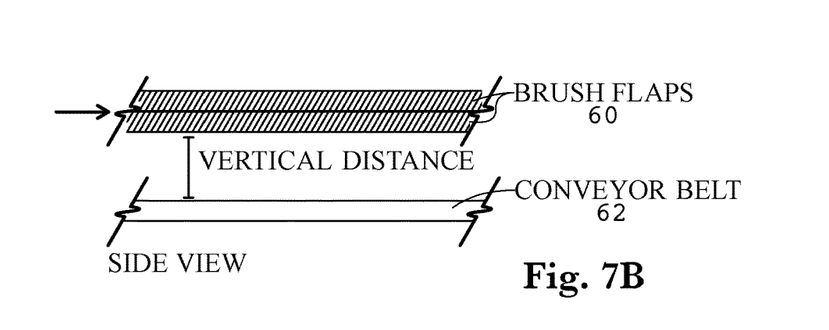
FIG. 7B illustrates one embodiment of a side view of a conveyor assembly showing brush flaps.

FIG. 7A illustrates one embodiment of a side view of each seat/conveyor assembly. FIG. 7B illustrates one embodiment of a side view of a conveyor assembly showing brush flaps 60. In the preferred embodiment, the conveyor magnetic belt 62 moves a bit lower than the surface of the plane. A crevice 64 is formed by the brush flaps that allow the seat to move along the conveyor. As shown in FIG. 6A, when the seat needs to move, the electromagnet below the seat is lowered through an electric motor to touch the magnetic conveyor belt. Simultaneously, the electromagnet is activated so that it is attracted to the conveyor belt surface so that the seat is ready to move on the belt.

In this approach, each seat is preferably connected to a control computer server via Wi-Fi. The key items controlled by the computer are: 1) when the seat moves by controlling the electromagnet below the seat (lowering or raising it and activating or deactivating the electromagnet); and 2) activating the valve which bifurcates seats coming back into the plane into various seat-columns/tracks. When the valve is moved to Position B, the seat moves into Track B and when the valve moves to Position A, the seat moves into Track A. The computer can also control the seat's movement using obstruction sensors to prevent any collision.

Figure 8A:
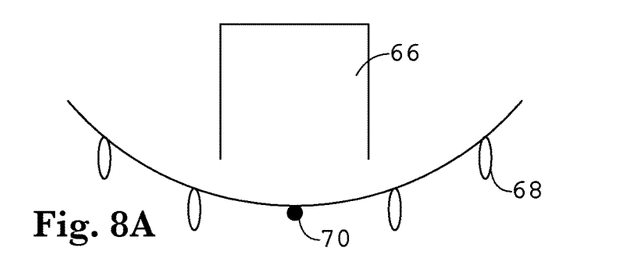
FIG. 8A illustrates one embodiment of self-driving vehicle of the present invention.
Figure 8B:
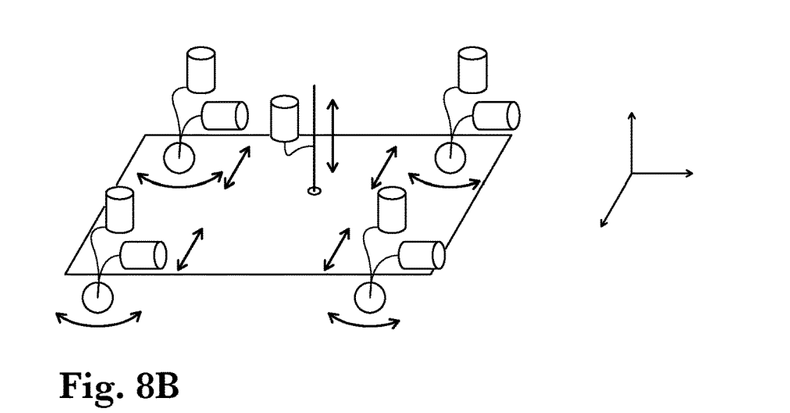
FIG. 8B illustrates a set of motors for driving the self-driving vehicle.
Figure 8C:
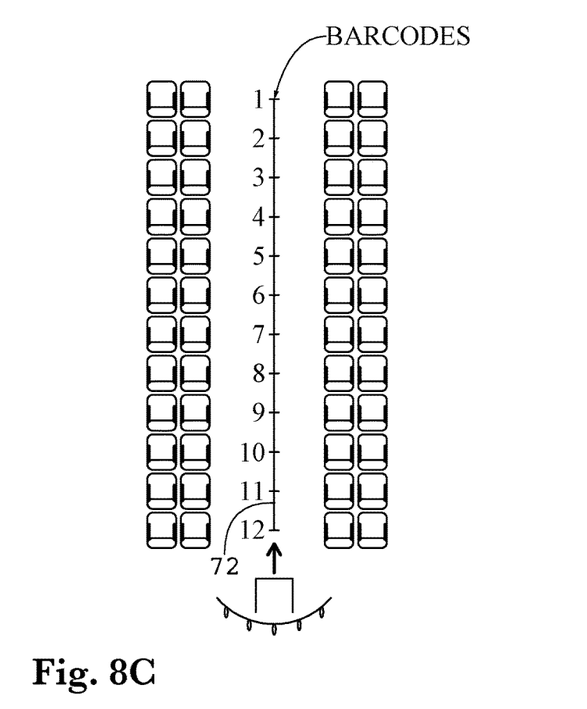
FIG. 8C illustrates one embodiment of the plane diagram illustrating a virtual track for guiding the self-driving vehicle.

In an alternative embodiment, tracks are virtual. Under this approach, each seat is a self-driving vehicle 66 which has four spherical wheels 68 as show in FIG. 8A. A camera 70 located on the unit helps drive the self-driving car according to the markings on the plane. FIG. 8A illustrates one embodiment of self-driving vehicle of the present invention. FIG. 8B illustrates set of motors for driving the self-driving vehicle. FIG. 8C illustrates one embodiment of the plane diagram illustrating a virtual track 72 for guiding the self-driving vehicle. The self-driving vehicle can drive itself by visualizing the markings in a plane. In one embodiment, the track is a painted line which is seen by the camera attached to the seat as shown in FIG. 8C. The outline of each seat position in the row is painted as well.

Each of the four spherical wheels preferably rotate by 90 degrees left and 90 degrees to the right. Motors connected to each wheel allow the wheels to move in X-Y plane as shown in FIG. 8b. The wheels can also move forward and backward using a second set of motors for each wheel as shown in FIG. 8b. All four wheels are preferably attached to a plate at the bottom of the seat (FIG. 8b). The plate can further move up and down along the Z direction using a separate motor. When the seat is ready to move, the computer can activate this motor so that the plate moves downwards and protrudes out from the bottom of the seat so that the wheels touch the floor of the plane. When the seat is in resting position, the plate moves into the bottom of the seat leaving the seat on the floor of the plane in steady state.

In the virtual track embodiment, the system can be adapted with algorithms to allow certain seats to deplane/board before others. For example, if certain passengers have a tight connection, certain seats could be guided to the exit first. The computer would need to use an algorithm to figure out what adjustment of seats that would be needed to accomplish this e.g., all tight connections could be in aisle seats so they are easy to deplane first. In such an embodiment, when re-boarding seats may end up in a place differently from where they originally started.

In one embodiment of the invention, each seat is connected to computer server via Wi-Fi. The control computer controls when the seat moves by controlling the plate that contains all four wheels as shown in FIG. 8b (e.g., by lowering or raising it as well as controlling all four wheels in the plate). The computer uses the camera within the seat and the seat number/location it is destined for to chart the course of the seat. The computer can also control the seat's movement using obstruction sensors to prevent any collision.

In one embodiment of the invention, each seat has its own computer system to take control of its guidance while communicating with the centralized control server to coordinate movement with other seats. Barcodes and sensors can be located at predetermined locations in the plane to also guide the seats to their correct location.

Figure 10:
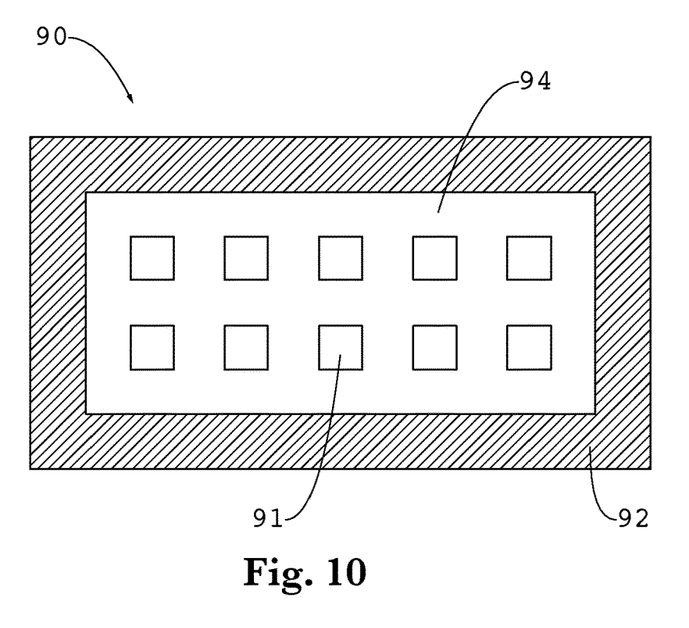
FIG. 10 illustrates one embodiment of the battery pack of the present invention.

In one embodiment of the invention, the seats are charged with a quick charging mechanism. For example, a battery pack may be placed within each seat. FIG. 10 illustrates one embodiment of the battery pack 90 of the present invention. The battery pack preferably contains a plurality of batteries 91 that supply power to the seat motors. The battery pack is preferably configured with an anti-fire coating 92 around the battery compartment. It is also preferred that the battery compartment be placed in a vacuum environment 94. The vacuum would remove critical oxygen needed to support a fire and the anti-fire coating would further suppress the start of a fire. All batteries are preferably connected in parallel to a charging station but are isolated from the rest of the plane circuitry to prevent any interference with the cockpit or other life support systems.

A solar coating for airplane surfaces can also be used to power seat batteries. Such a coating would become part of the plane body similar to the solar roofing and supply electricity needed for seats and possibly other airplane components. The charging method could charge the seats without the need for the plane to remain on the ground for an extended period of time for charging purposes. This large surface area of the plane is adequate for charging the seats of the present invention.

When a plane arrives at the gate, each row of seating with the storage compartment will be sequentially moved by a computer along a track for each column. Once at the deplaning area, the passengers will unbuckle their safety belt and remove their luggage from the storage bin above them which is attached to their seat. A seat weight sensor will verify that the passenger and luggage are off the seat and allow additional time (e.g., 5-10 seconds) before moving the seats to the next location. The seat can also be adapted with multiple obstruction sensors that are adapted to sense anything in its way. Upon detecting an object, the seat will stop and will need an override from a person to proceed. While the seats are leaving to the boarding staging area, the plane can be can be easily vacuum-cleaned.

During the boarding process, each passenger places their luggage in the bin above the seat and wipes their boarding pass on a seat electronic console. Alternatively, each passenger would need to show their boarding pass before proceeding to the boarding carousel. Passengers can use a turnstile type scanner just like in a subway station. This will be done in lieu of attendants scanning the tickets. Once all passengers are strapped in, the carousel can move all seats onto tracks while another round of seats come in from deplaning carousel to be boarded. This process would repeat until the plane is completely deplane and boarded with new passengers.

Figure 9A:
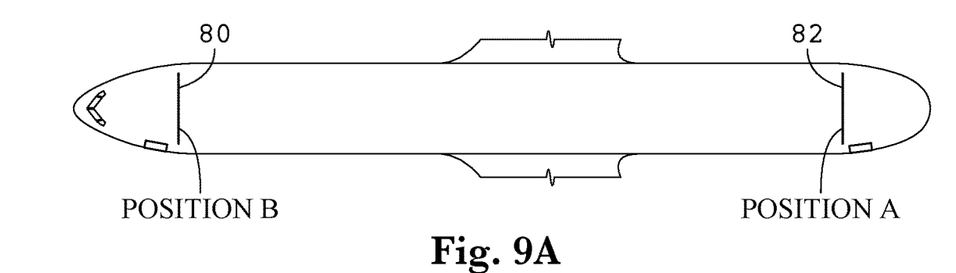
FIG. 9A illustrates one embodiment of retractable glass doors for separating seats being deplaned from those being boarded.
Figure 9B:
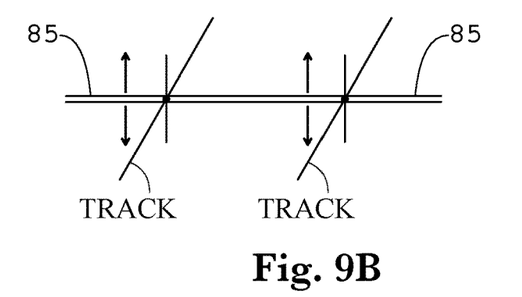
FIG. 9B illustrates the glass doors of FIG. 9A in a retracted position.

FIG. 9A illustrates one embodiment of retractable glass doors for separating seats being deplaned from those being boarded (slits in the plane at 80, 82 are used to retract the glass doors when not in use). FIG. 9B illustrates the glass doors of FIG. 9A in a retracted position. As each seat is emptied in the deplaning area, these seats will eventually move back to the boarding area where boarding can occur simultaneously with the deplaning of other seats. Within the plane, seats deplaning are separated from the seats being boarded by the movable manned glass door. The glass door preferably moves on the same track and retracts into the floor of the plane like a car door window. In one embodiment, the glass doors are actuated manually by a crew member keying in a code. There are two specific positions in the plane where the glass would slide in/out into the plane (position A—where the seats enter the plane for boarding) and where it would retract back after the seats have moved back into the plane to complete boarding (Position B).

In other words, the glass doors come out in the back of the plane and retract back into the plane towards the front of plane. Because the plane is deplaning and boarding simultaneously, the glass doors provide separation between the two populations (boarding and deplaning populations). As soon as the first seat begins to board the plane from the back door, the glass doors emerge from the plane (Position A). The glass doors then move into the plane towards the front of the plane, in the lead with boarding seats behind it. The glass doors remain extended into the plane and proceed with the seats being boarded behind. The glass movement is also controlled by computer algorithm as is the case with seats. As more and more seats board, and more rows are occupied, the glass doors move forward and provide separation between seats that are still in the plane to be de-planed and newly boarded seats. Finally, when the entire plane has boarded, the glass doors can be retracted back into the plane and doors of plane locked for takeoff.

As shown in FIG. 9B, the glass door are preferably composed of two parts, each operating on separate tracks but working in synchronized fashion. The glass doors rests on a frame 85 connected to the track via the same mechanism as the seat (except that the mechanism that attaches to the slit can move up and down via a motor controlled by the control computer). The glass slides out in position A where the track is perpendicular to the glass door slit and moves along the track until it reaches position B where track becomes perpendicular to the track again and is no longer in way of the glass slit.

It is appreciated that the various algorithms may be used to board and deplane according to the present invention. Not all seats on a track need to move at the same time. If the computer wants to move a seat, it activates the clamp on each seat which moves it into mobile position. A seat in front should move to allow seats behind it to move forward. When multiple tracks merge into a track, seats can be moved such that all seats on a given track can be emptied before another track is emptied. Alternately, each row can be emptied before the next row is emptied. Finally, a combination of the two can be implemented in which few consecutive seats on a track are emptied, followed by a second track.

As each of the seats in front move, the rear seats move forward to make room for seats in the back. All seats do not need to move in unison. The computer has control of when and how many seats move forward. As seats move forward, space is created in the back of the plane. Thus, as seats are disembarked in disembarkation area, boarding can proceed from the rear of the plane as shown in FIGS. 1 and 2. This makes the process of boarding and deplaning a simultaneous process rather than a sequential process. As seats move from disembarkation area to boarding area, cleaning of seats would occur in real-time between deplaning and boarding areas from where the seats would move to boarding area. As seats in place move forward and new seats move into the plane with passengers, the area between rows in plane where passengers are deplaning and area where seats are boarding are preferably separated by several rows to create a distinct area of separation. Further a sliding glass door can be adapted to open from the bottom of the plane (move similar to the seats on one of the tracks). The glass would move forward as separation between the two areas moves. Finally, as entire plane has deplaned, the glass door can be controlled to retract back. The glass area would be manned by a person and would only retract outside of the computer algorithm through a security code to be keyed in by manned personnel.

It is appreciated that the deplaning and boarding areas can be optimized for size, based on factors such as the size of the plane, the required speed of the system, and area needed for deplaning and boarding according to the present system. For example, a group of 5-10 seats at a time per column (and 2-3 columns at any one time) would be manageable. The overall area needed near a gate (staging/seating area) may increase, but since the boarding and deplaning process may be cut in half or even less, the same gate can handle more traffic reducing the number of required gates.

In order to ensure the safety of those using the system and those also around the system can be configure with motion sensors attached around the seat. If the sensors notice a person or object is too close to the seats, an emergency system will be in place to automatically stop the seats until the obstruction is moved or moves away. Additionally, in order for the seats to move, the passenger must put on their safety belts. The system is adapted so that human attendants can move the seats manually.

In the case of virtual tracks, if a seat control system fails, a seat behind it would still be able move since it can move sideways and has 360-degree freedom of motion guided by computer algorithm. Further, an obstructing seat is adapted with a manual override by which wheels on the seat can be ejected out of the seat through a manual level. After the wheels are removed, the seat can be moved to the side by moving the seat physically. These kinds of redundancies can be built into the system.

Finally, as in case of electronic controls in manufacturing conditions, each motor can send an error signal if it is not working. These error codes can be monitored by a dashboard and fed into computer algorithm that moves the seats to minimize any disruption to the seating procedure.

The savings for airlines provided by the present invention are significant and offsets the investment needed to provision the system in new and existing airports. Much reduced boarding and deplaning time would mean need for fewer gates, fewer planes and more crew utilization.

While certain embodiments of the present invention are described in detail above, the scope of the invention is not to be considered limited by such disclosure, and modifications are possible without departing from the spirit of the invention as evidenced by the following claims:

1. A system for deplaning and boarding an airplane, the airplane comprised of a first, second, third, and fourth column of seats, the system comprising:
- a first track for moving seats in the first and second column of seats from the airplane to a deboarding area, to a boarding area, and back to the airplane;
- a second track for moving seats in the third and fourth column of seats from the airplane to a deboarding area, to a boarding area, and back onto the airplane;
- wherein the first column of seats is adapted to move onto the first track and wherein the system is adapted to move the first column of seats along the first track;
- wherein the second column of seats is adapted to move onto the first track and wherein the system is adapted to move the second column of seats along the first track;
- wherein the third column of seats is adapted to move onto the second track and wherein the system is adapted to move the third column of seats along the second track;
- wherein the fourth column of seats is adapted to move onto the second track and wherein the system is adapted to move the fourth column of seats along the second track;
- wherein each of the seats is comprised of a compartment for storing luggage and a connector for connecting each seat to one of the tracks.

2. The system according to claim 1, further comprising a first seat-column track for moving the seats in the first column of seats and a second seat-column track for moving the seats in the second column of seats; and wherein the first and second seat-column tracks merge into the first track.

3. The system according to claim 1, further comprising a third seat-column track for moving the seats in the third column of seats and a fourth seat-column track for moving the seats in the fourth column of seats;

wherein the third and fourth seat-column tracks merge into the second track.

4. The system according to claim 1, wherein at least one track is a conveyor system having a magnetic belt.

5. The system according to claim 4, wherein the connector on the seat is an electromagnetic connector.

6. The system according to claim 1, wherein the connector is adapted to lower and raise on and off the track.

7. The system according to claim 1, wherein each of the seats is comprised of a chargeable battery.

8. The system according to claim 1, wherein each of the seats is comprised of a compartment for storing emergency equipment.

9. The system according to claim 1, wherein the first track is arranged in a circular arrangement located in the deplaning area.

10. The system according to claim 9, wherein the first track is arranged in a circular arrangement located in the boarding area.

11. The system according to claim 1, wherein the first and second tracks are arranged in a loop configuration for moving seats from the airplane, to a deboarding area, to a boarding area and then back to the airplane.

12. The system according to claim 1, wherein the first and second track are virtual tracks.

13. The system according to claim 12, wherein the seat is comprised of a camera for guiding the seat along the virtual track.

14. The system according to claim 13, wherein the seat is comprised of a set of four wheels and motors connected to each wheel for driving the seat along the virtual track.

15. The system according to claim 12, further comprising a processing system, the processing system programmed with instructions executing on the processing system for controlling the movement of each of the seats to move along the virtual track.

16. The system according to claim 12, further comprising sensors located on each of the seats for detecting obstructions.

17. The system according to claim 12, further comprising barcodes located at predetermined locations for guiding the movement of seats along the virtual track.

18. The system according to claim 1, where the first and second tracks are located below the level of the floor and wherein the connectors on the seats are adapted to lower and connect to the tracks.

19. The system of claim 18, wherein the connectors are rotatable allowing the seat to rotate.

20. A system for deplaning and boarding an airplane, the airplane comprised of a first, second, third, and fourth column of seats, the system comprising:

a first track for moving seats in the first and second column of seats from the airplane to a deboarding area, to a boarding area, and back to the airplane;

a second track for moving seats in the third and fourth column of seats from the airplane to a deboarding area, to a boarding area, and back onto the airplane wherein the first column of seats is adapted to move onto the first track and wherein the system is adapted to move the first column of seats along the first track;

wherein the second column of seats is adapted to move onto the first track and wherein the system is adapted to move the second column of seats along the first track;

wherein the third column of seats is adapted to move onto the second track and wherein the system is adapted to move the third column of seats along the second track;

wherein the fourth column of seats is adapted to move onto the second track and wherein the system is adapted to move the fourth column of seats along the second track;

wherein each of the seats is comprised of a compartment for storing luggage and a connector for connecting each seat to one of the tracks;

wherein the first and second tracks are each comprised of a conveyor system having a magnetic belt;

wherein the connector on the seat is an electromagnetic connector.

21. The system according to claim 20, wherein the connector is adapted to lower and raise on and off the track.

22. The system according to claim 20, further comprising a first seat-column track for moving the seats in the first column of seats and a second seat-column track for moving the seats in the second column of seats; and wherein the first and second seat-column tracks merge into the first track.

23. The system according to claim 20, further comprising a third seat-column track for moving the seats in the third column of seats and a fourth seat-column track for moving the seats in the fourth column of seats; and wherein the third and fourth seat-column tracks merge into the second track.

24. The system according to claim 20, wherein each of the seats is comprised of a chargeable battery.

25. The system according to claim 20, wherein each of the seats is comprised of a compartment for storing emergency equipment.

26. A system for deplaning and boarding an airplane, the airplane comprised of a first and second column of seats, the system comprising:

a first track for moving seats in the first and second column of seats from the airplane to a deboarding area, to a boarding area, and back to the airplane;

wherein the first column of seats is adapted to move onto the first track and wherein the system is adapted to move the first column of seats along the first track;

wherein the second column of seats is adapted to move onto the first track and wherein the system is adapted to move the second column of seats along the first track;

wherein each of the seats is comprised of a compartment for storing luggage and a connector for connecting each seat to the first track.

27. The system of claim 26, wherein the first track is a virtual track;

wherein the seat is comprised of a camera for guiding the seat along the virtual track;

wherein the seat is comprised of a set of four wheels and motors connected to each wheel for driving the seat along the virtual track; and the system further comprising a processing system, the processing system programmed with instructions executing on the processing system for controlling the movement of each of the seats to move along the virtual track.

28. The system of claim 26, further comprised of:
retractable glass doors adapted to move along the first track for providing separation between seats that are deplaning and seats that are boarding.

29. The system of claim 26 further comprising a plurality of battery packs for supplying power to the seats, each battery pack comprised of a plurality of batteries encased in a vacuum and enclosed by a fire-retardant coating material.

\* \* \* \* \*